US009387759B2

(12) United States Patent
Wen et al.

(10) Patent No.: US 9,387,759 B2
(45) Date of Patent: Jul. 12, 2016

(54) FLOW DIVIDER FREE WHEELING VALVE

(71) Applicant: Caterpillar Inc., Peoria, IL (US)

(72) Inventors: Gang Victor Wen, Champaign, IL (US); Sudarshan Maiyur, Cary, NC (US); Moses Imo Akpan, Channahon, IL (US)

(73) Assignee: Caterpillar Inc., Peoria, IL (US)

( * ) Notice: Subject to any disclaimer, the term of this patent is extended or adjusted under 35 U.S.C. 154(b) by 114 days.

(21) Appl. No.: 14/492,311

(22) Filed: Sep. 22, 2014

(65) Prior Publication Data

US 2016/0082828 A1  Mar. 24, 2016

(51) Int. Cl.

| E02F 9/22 | (2006.01) |
|---|---|
| B60K 7/00 | (2006.01) |
| F16K 11/02 | (2006.01) |
| F16K 31/44 | (2006.01) |
| B23P 15/00 | (2006.01) |

(52) U.S. Cl.
CPC ............... *B60K 7/0015* (2013.01); *B23P 15/00* (2013.01); *E02F 9/22* (2013.01); *E02F 9/2267* (2013.01); *F16K 11/02* (2013.01); *F16K 31/44* (2013.01); *B23P 2700/50* (2013.01)

(58) Field of Classification Search
CPC ....... B60K 7/0015; F16K 11/02; F16K 31/44; F16K 11/00; E02F 9/22; E02F 9/2267; E02F 9/221; E02F 9/2246; E02F 9/2225; E02F 9/2282; E02F 9/2285; E02F 9/2289; E02F 9/2278
See application file for complete search history.

(56) References Cited

U.S. PATENT DOCUMENTS

| 3,182,444 | A | 5/1965 | Quayle |
| 3,759,292 | A | 9/1973 | Bianchetta et al. |
| 3,762,166 | A | 10/1973 | Dunham |
| 3,915,068 | A | 10/1975 | Gassman |
| 4,236,595 | A * | 12/1980 | Beck ..................... F16H 61/472 180/197 |
| 4,276,896 | A | 7/1981 | Hunck et al. |
| 4,340,126 | A | 7/1982 | Larson |
| 5,282,363 | A | 2/1994 | Ogawa et al. |
| 5,607,027 | A * | 3/1997 | Puett, Jr. ................. B60K 17/10 180/242 |
| 5,647,211 | A * | 7/1997 | Harber .................. E02F 9/2253 60/484 |
| 5,682,958 | A * | 11/1997 | Kalhorn ................. B60K 17/10 180/14.3 |
| 6,508,328 | B1 * | 1/2003 | Kenyon .................. F16H 61/44 180/305 |
| 6,922,992 | B1 * | 8/2005 | Morgan .................. F15B 11/22 60/484 |
| 7,549,241 | B2 | 6/2009 | Ioku et al. |
| 9,266,420 | B2 * | 2/2016 | Edward ................. B60K 7/0015 |
| 2010/0018728 | A1 * | 1/2010 | Bright .................... B62D 53/02 172/3 |
| 2013/0125539 | A1 | 5/2013 | Kobayashi et al. |

* cited by examiner

*Primary Examiner* — John Walters
*Assistant Examiner* — Brian Swenson
(74) *Attorney, Agent, or Firm* — Miller, Matthias & Hull LLP

(57) ABSTRACT

A main valve and method assembling for use on a machine is disclosed. The main valve may comprise a body, a free wheeling valve, a bypass valve, a flow divider valve, a free wheeling pilot valve, and a flow divider bypass pilot control valve. Each valve may be disposed inside the body. The body may define a plurality of ports and channels between the valves. The free wheeling valve may be operable between a free wheeling mode and a drive assist mode. The bypass valve may have a flow dividing mode that permits fluid communication between the free wheeling valve and the flow divider valve, and a bypass mode that permits fluid communication between the free wheeling valve and first and second bypass channels.

20 Claims, 5 Drawing Sheets

FLOW DIVIDER FREE WHEELING VALVE

TECHNICAL FIELD

The present disclosure generally relates to wheel assist drives, and more particularly a valve to actuate and control front wheel assist drive in a machine.

BACKGROUND

Various types of machines employ a wheel assist drive to provide all-wheel driving in slippery conditions. A motor grader, for example, is typically used in off-road environments to perform ditch work, site preparation, and other surface contouring and finishing tasks where obtaining sufficient traction may be difficult. The motor grader will often have a first set of wheels (such as a pair of rear wheels) driven directly by a combustion engine or primary hydraulic pump. A second set of wheels (such as a pair of front wheels) are typically used for steering. The front wheels, however, may be driven by hydraulic assist motors that are part of a wheel assist drive that permits all-wheel driving.

The wheel assist drive may be selectively engaged so that the machine operates in all-wheel drive mode only when desired. For example, the machine may include a user interface that allows an operator to switch the wheel assist drive on or off. Additionally, or alternatively, a controller operably coupled to the wheel assist drive may automatically engage or disengage the wheel assist drive based on feedback indicative of the level of traction between the wheels and the surface. In some embodiments, a free wheeling main valve may be utilized to block fluid flow to front wheel assist motors during when the wheel assist drive is not engaged during rear-wheel drive mode and to allow fluid flow to the front wheel assist motors when the wheel assist drive is engaged for all-wheel drive mode.

Some previous wheel assist drives have also been used in conjunction with a flow dividing valve to reduce front wheel slip during all-wheel drive mode. Without the flow dividing valve, when a first assist motor associated with a slipping wheel turns more rapidly, it draws an increased flow of hydraulic fluid. The increased flow to the slipping assist motor reduces hydraulic fluid flow to a second assist motor, which in turn reduces the rotational speed of the wheel that has traction. In excessive slip situations, substantially all of the hydraulic flow may be directed to the assist motor associated with the slipping wheel, thereby impacting the ability of the machine to travel over the surface. The flow dividing valve addresses the wheel slip condition by regulating hydraulic fluid flow to the two hydraulic assist motors coupled to the front wheels. In general, the flow dividing valve will regulate hydraulic pressures delivered to the assist motors by bringing those pressures closer to being equal. More specifically, the flow dividing valve senses hydraulic fluid pressures delivered to each of the hydraulic assist motors and, when a reduced pressure is sensed at one of the assist motors, the flow dividing valve adjusts to reduce hydraulic fluid flow to that assist motor, thereby improving traction of the wheel associated with the other assist motor.

U.S. Pat. No. 4,276,896 to Hunck et al. proposes a direction sensing valve that operates to maintain equal flow of fluid in the first and second motors in either forward or reverse direction of operation. While this valve may provide benefits, it does not provide all-wheel drive, anti-cavitation features and other desired features. A better valve is desired.

SUMMARY OF THE DISCLOSURE

In accordance with one aspect of the present disclosure, a main valve is disclosed. The main valve may comprise a body, a free wheeling valve, a bypass valve, a flow divider valve, a free wheeling pilot valve, and a flow divider bypass pilot control valve. The body may define a supply port, a first exit port, a second exit port, an intermediate channel, a flow divider channel, a first bypass channel, a second bypass channel, a free wheeling pilot channel, and a bypass pilot channel. The free wheeling valve may be disposed in the body and may be fluidly connected to the supply port. The free wheeling valve may be operable between a free wheeling mode that blocks fluid flow out of the first and second exit ports by blocking fluid flow between the supply port and a bypass valve, and a drive assist mode that permits fluid flow out of the first and second exit ports by permitting fluid from the supply port to flow to the bypass valve. The bypass valve may be disposed in the body and may be fluidly connected to the free wheeling valve by the intermediate channel. The bypass valve may be fluidly connected to the first and second bypass channels and a flow divider valve. The bypass valve may have a flow dividing mode that permits fluid communication between the free wheeling valve and the flow divider valve, and a bypass mode that permits fluid communication between the free wheeling valve and the first and second bypass channels. The flow divider valve may be disposed in the body and include a flow divider inlet fluidly connected to the bypass valve by the flow divider channel, a first flow divider outlet fluidly connected to the first exit port, and a second flow divider outlet fluidly connected to the second exit port. The flow divider inlet may be in fluid communication with the first and second flow divider outlets. The free wheeling pilot valve may be disposed in the body and may be fluidly connected to the free wheeling valve by the free wheeling pilot channel. The flow divider bypass pilot control valve may be disposed in the body and may be fluidly connected to the bypass valve by the bypass pilot channel.

In accordance with another aspect of the present disclosure, a method of assembling a wheel assist drive system on a machine having first and second wheel motors and a primary pump for circulating a hydraulic fluid. The method may comprise providing a main valve, and fluidly connecting the main valve to the first and second wheel motors and the primary pump. The main valve may include a body, a free wheeling valve disposed in the body, bypass valve disposed in the body, a flow divider valve disposed in the body, a free wheeling pilot valve disposed in the body, and a flow divider bypass pilot control valve disposed in the body. The body may define a supply port, a return port, a first exit port, a second exit port, a return inlet port, a supply channel, an intermediate channel, a flow divider channel, a first exit channel, a second exit channel, a first bypass channel, a second bypass channel, a return channel, a return outlet channel, a free wheeling pilot channel, and a bypass pilot channel. The free wheeling valve may be fluidly connected to the supply port by the supply channel. The free wheeling valve may be operable between a free wheeling mode that blocks fluid flow out of the first and second exit ports by blocking fluid flow between the supply port and a bypass valve, and a drive assist mode that permits fluid flow out of the first and second exit ports by permitting fluid from the supply port to flow to the bypass valve. The bypass valve may be fluidly connected to the free wheeling valve by the intermediate channel. The bypass valve may be fluidly connected to the first exit channel by the first bypass channel, and the bypass valve fluidly connected to the second exit channel by the second bypass channel. The bypass valve may be fluidly connected to a flow divider valve. The bypass valve may have a flow dividing mode that permits fluid communication between the free wheeling valve and the flow divider valve, and a bypass mode that permits fluid communication between the free wheeling valve and the first and second bypass channels. The flow divider valve may include a flow divider inlet fluidly connected to the bypass valve by a flow divider channel, a first flow divider outlet fluidly connected to the first exit port by the first exit channel, and a second flow divider outlet fluidly connected to the second exit port by the second exit channel. The flow divider inlet may be in fluid communication with the first and second flow divider outlets. The free wheeling pilot valve may be fluidly connected to the free wheeling valve by the free wheeling pilot channel. The flow divider bypass pilot control valve may be fluidly connected to the bypass valve by the bypass pilot channel.

In accordance with another aspect of the present disclosure, a wheel assist drive system for use on a machine having a primary pump and first and second ground-engaging members is disclosed. The wheel assist drive system may comprise a hydraulic first wheel motor operably coupled to the first ground-engaging member, a hydraulic second wheel motor operably coupled to the second ground-engaging member, a main valve, and a controller. The main valve may include a body, a free wheeling valve disposed in the body, a bypass valve disposed in the body, a flow divider valve disposed in the body, a free wheeling pilot valve disposed in the body, and a flow divider bypass pilot control valve disposed in the body. The body may define a supply port, a return port, a first exit port, a second exit port, a return inlet port, a supply channel, an intermediate channel, a flow divider channel, a first exit channel, a second exit channel, a first bypass channel, a second bypass channel, a return channel, a return outlet channel, a free wheeling pilot channel, and a bypass pilot channel. The free wheeling valve may include a first free wheeling valve inlet fluidly connected to the supply port by the supply channel, a second free wheeling valve inlet fluidly connected to the return port by the return outlet channel, a first free wheeling valve outlet fluidly connected to the first free wheeling valve inlet, and a second free wheeling valve outlet fluidly connected to the second free wheeling valve inlet. The free wheeling valve may be operable between a free wheeling mode that blocks fluid flow out of the first and second exit ports by blocking fluid between the supply port and the first free wheeling valve outlet, and a drive assist mode that permits fluid flow out of the first and second exit ports by permitting fluid from supply port to flow out of the first free wheeling valve outlet. The bypass valve may include a bypass inlet fluidly connected to the first free wheeling valve outlet by the intermediate channel, a first bypass outlet fluidly connected to the first exit channel by the first bypass channel, a second bypass outlet fluidly connected to the second exit channel by the second bypass channel, and a third bypass outlet. The bypass valve may have a flow dividing mode that permits fluid communication between the free wheeling valve and the flow divider valve, and a bypass mode that permits fluid communication between the free wheeling valve and the first and second bypass channels. The flow divider valve may be disposed in the body and may include a flow divider inlet fluidly connected to the third bypass outlet by a flow divider channel, a first flow divider outlet fluidly connected to the first exit port by the first exit channel, and a second flow divider outlet fluidly connected to the second exit port by the second exit channel. The flow divider inlet may be in fluid communication with the first and second flow divider outlets. The free wheeling pilot valve may be fluidly connected to the free wheeling valve by the free wheeling pilot channel. The flow divider bypass pilot control valve may be fluidly connected to the bypass valve by the bypass pilot channel. The controller may be operably coupled to the free wheeling valve and the bypass valve. The controller may be configured to determine an activation status of the free wheeling valve, operate the bypass valve in the bypass mode when the free wheeling valve is in the free wheeling mode, and operate the bypass valve in either of the bypass mode and the flow dividing mode when the free wheeling valve is in the drive assist mode.

DETAILED DESCRIPTION

Embodiments of the wheel assist drive system, including a master valve, and related method are disclosed for use on a machine. In the exemplary embodiments described herein, the machine is a motor grader. The wheel assist drive system includes a main valve for providing all-wheel drive and for providing traction control.

Figure 1:
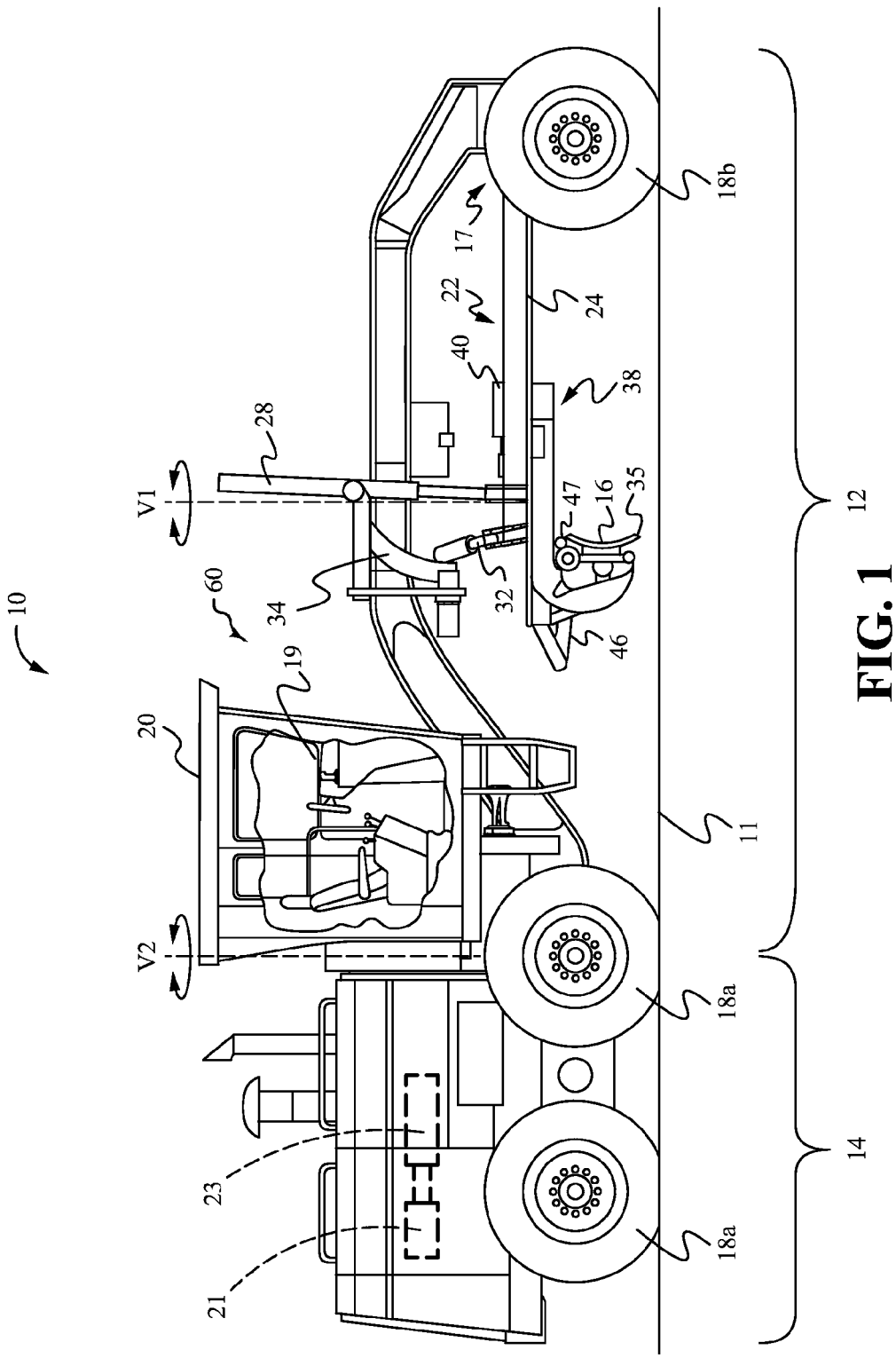
FIG. 1 is a schematic side view of a motor grader within which one or more embodiments of the present disclosure may be implemented.
Figure 2:
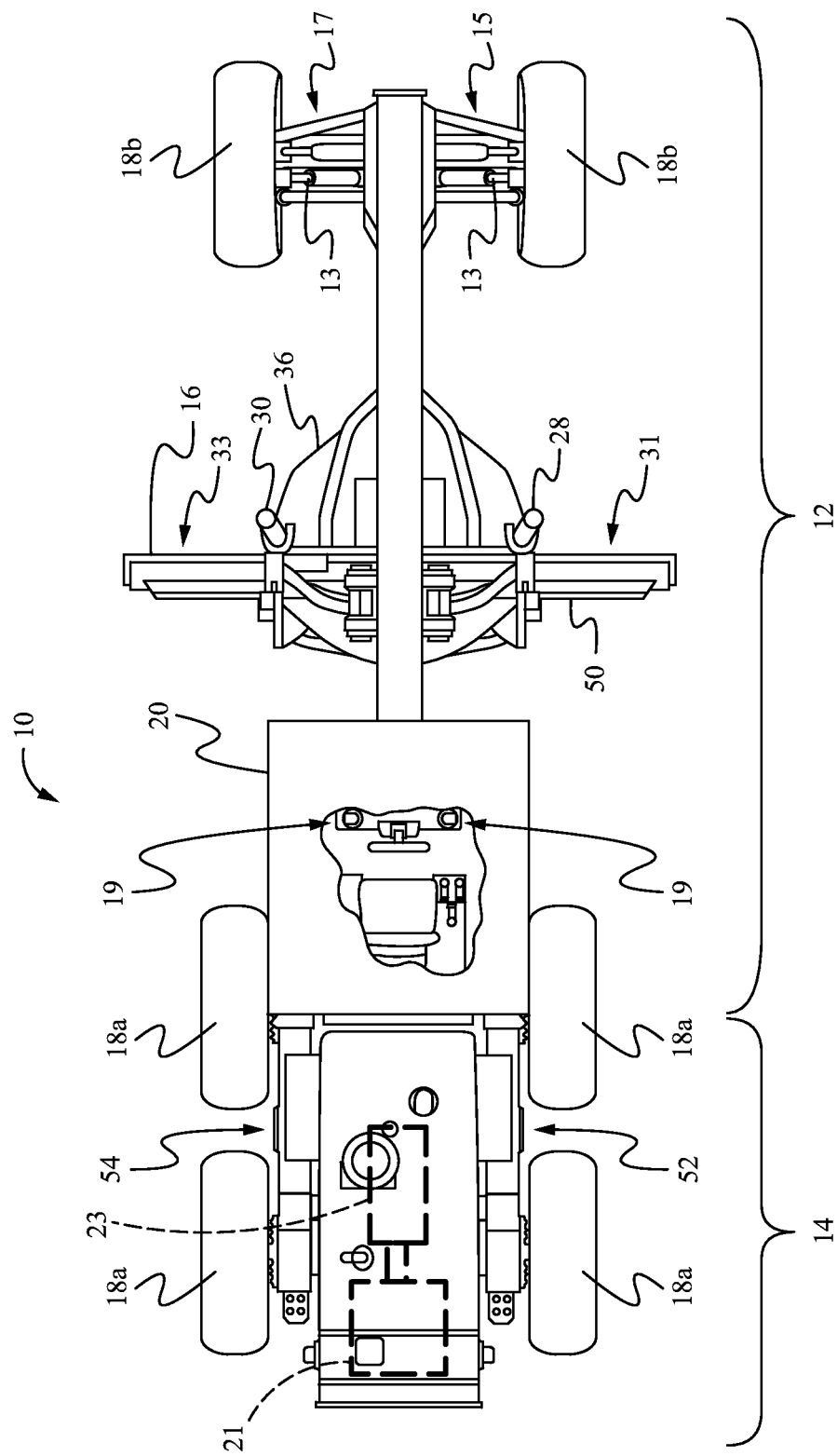
FIG. 2 is a schematic top view of a motor grader within which one or more embodiments of the present disclosure may be implemented.

FIGS. 1 and 2 depict an exemplary embodiment of a machine, such as a motor grader 10. The motor grader 10 may be used primarily as a finishing tool to sculpt a surface 11 of earth or other material to a final arrangement. Rather than moving large quantities of earth in the direction of travel like other machines, such as a bulldozer, the motor grader 10 typically moves relatively small quantities of earth from side to side. In other words, the motor grader 10 typically moves earth across the area being graded, not straight ahead. While the exemplary embodiment is shown in the form of the motor grader 10, it will be appreciated that the current system may be used with other types of machines that may benefit from the advantages taught herein.

More specifically, the motor grader 10 includes a front frame 12, a rear frame 14, and a motor grader implement, such as a blade 16. The front and rear frames 12 and 14 are supported by ground engaging members, such as a set of rear wheels 18a and a set of front wheels 18b. An operator cab 20, containing many controls 19 necessary to operate the motor grader 10, is mounted on the front frame 12. A primary power source 21 may be supported by the rear frame 14 and operably coupled through a transmission 23 to the rear wheels 18a for primary machine propulsion. The primary power source 21 may be, for example, a diesel engine, a gasoline engine, a natural gas engine, or any other engine known in the art. The primary power source 21 may also be an electric motor linked to a fuel cell, a capacitive storage device, a battery, or another source of power known in the art. The transmission may be a mechanical transmission, hydraulic transmission, or any other transmission type known in the art. The transmission may be operable to produce multiple output speed ratios (or a continuously variable speed ratio) between the power source and driven traction devices.

A vehicle steering system 17 includes steering actuators 13 (FIG. 2) that turn the front wheels 18b. The vehicle steering system 17 may also include a wheel lean actuator 15 that tilts the front wheels 18b from left to right.

The blade 16 (FIGS. 1-2), alternatively referred to as a moldboard, is used to move earth. The blade 16 is mounted on a linkage assembly, shown generally at 22. The linkage assembly 22 allows the blade 16 to be moved to a variety of different positions relative to the motor grader 10.

The linkage assembly 22 may include a drawbar 24 mounted to the front frame 12 by a ball joint. The position of the drawbar 24 is controlled by three hydraulic actuators, commonly referred to as a right lift actuator 28 (FIG. 2), a left lift actuator 30, and a center shift actuator 32 (FIG. 1). A coupling, shown generally at 34, connects the three actuators 28 (FIG. 2), 30, and 32 (FIG. 1) to the front frame 12. The coupling 34 can be moved during blade repositioning but is fixed stationary during earthmoving operations. The height of the blade 16 with respect to the surface 11 below the motor grader 10, commonly referred to as blade height, is controlled primarily with the right and left lift actuators 28 (FIG. 2) and 30. The right and left lift actuators 28 and 30 are connected to right 31 and left 33 portions of the blade 16 respectively. The actuators 28, 30 can be controlled independently and, thus, used to angle a bottom cutting edge 35 (FIG. 1) of the blade 16 relative to the surface 11. The center shift actuator 32 is used primarily to side shift the drawbar 24, and all the components mounted to the end of the drawbar including the blade 16, relative to the front frame 12. This side shift is commonly referred to as drawbar side shift or circle center shift.

The drawbar 24 includes a large, flat plate, commonly referred to as a yoke plate 36, as shown in FIG. 2. Beneath the yoke plate 36 is a large gear, commonly referred to as a circle 38 (FIG.1). The circle 38 is rotated by a hydraulic motor, commonly referred to as a circle drive 40, as shown in FIG. 1. The rotation of the circle 38 by the circle drive 40, commonly referred to as circle turn, pivots the blade 16 about a first vertical axis V1 fixed to the drawbar 24 to establish a blade cutting angle. The blade cutting angle is defined as the angle of the blade 16 relative to the front frame 12. At a zero degree blade cutting angle, the blade 16 is aligned at a right angle to the front frame 12. In FIG. 2, the blade 16 is shown set at a zero degree blade cutting angle.

The blade 16 is mounted to a hinge on the circle 38 with a bracket. A blade tip actuator 46 is used to pitch the bracket forward or rearward. In other words, the blade tip actuator 46 is used to tip or tilt a top edge 47 of the blade 16 ahead of or behind the bottom cutting edge 35 of the blade 16. The position of the top edge 47 of the blade 16 relative to the bottom cutting edge 35 of the blade 16 is commonly referred to as blade tip.

The blade 16 is mounted to a sliding joint in the bracket allowing the blade 16 to be slid or shifted from side to side relative to the bracket or the circle 38. This side-to-side shift is commonly referred to as blade side shift. A side shift actuator 50 is used to control the blade side shift.

Referring specifically to FIG. 2, a right articulation actuator, shown generally at 52, is mounted to the right side of the rear frame 14 and a left articulation actuator, shown generally at 54, is mounted to the left side of the rear frame 14. The right and left articulation actuators 52 and 54 are used to rotate the front frame 12 about a second vertical axis V2 shown in FIG. 1. The axis V2 is commonly referred to as the articulation axis. In FIG. 2, the motor grader 10 is shown positioned in a neutral or zero articulation angle.

Figure 3:
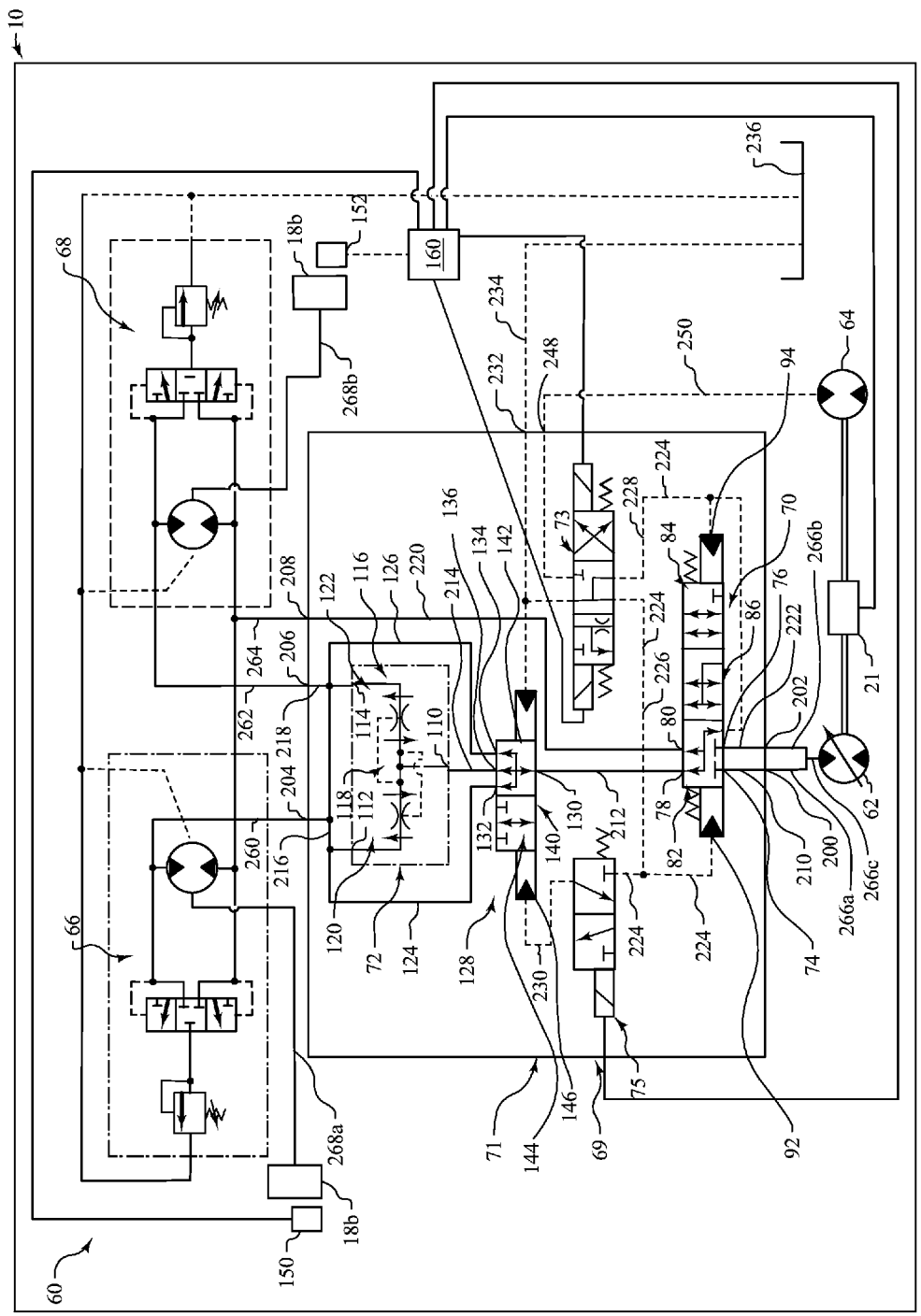
FIG. 3 is a schematic diagram showing a wheel assist drive system of the motor grader constructed in accordance with an aspect of the disclosure.

FIG. 3 illustrates a wheel assist drive system 60 that may be used to drive the front wheels 18b. The wheel assist drive system 60 may include a primary pump 62 operably coupled to the primary power source 21 for circulating hydraulic fluid through the system. A pilot pump 64 may also be provided to help actuate various hydraulic components of the system.

The wheel assist drive system 60 may be configured to hydraulically drive the front wheels 18b when desired. In the illustrated embodiment, hydraulic first and second wheel motors 66, 68 are operably coupled to the front wheels 18b. Hydraulic fluid supplied by the primary pump 62 flows to the first and second wheel motors 66, 68 to rotate the associated front wheels 18b, thereby to operate the machine in all-wheel drive mode. The flow of hydraulic fluid to the first and second wheel motors 66, 68 may be selectively controlled by a single main valve 69, as described in greater detail below.

The main valve 69 may comprise a body 71, a free wheeling valve 70, a bypass valve 128, a flow divider valve 72, a free wheeling pilot valve 73, and a flow divider bypass pilot control valve 75.

The body 71 may define a supply port 200, a return port 202, a first exit port 204, a second exit port 206, a return inlet port 208, a supply channel 210, an intermediate channel 212, a flow divider channel 214, a first exit channel 216, a second exit channel 218, a first bypass channel 124, a second bypass channel 126, a return channel 220, a return outlet channel 222, a free wheeling pilot channel 224 including a first branch 226 and a second branch 228, and a bypass pilot channel 230. In an embodiment, the body 71 may further define a tank port 232 and a tank channel 234 extending between the bypass valve 128 and the tank port 232. The tank port 232 may be fluidly connected to a tank 236 that is a repository of hydraulic fluid. The tank channel 232 may also extend between the free wheeling pilot valve 73 and the tank port 232. The body 71 may also define a charge port 248 and a charge channel 250. The charge channel 250 may extend between the free wheeling pilot valve 73 and the charge port 248. When installed in a machine, hoses or the like may fluidly connect the charge port 248 to the pilot pump 64 and may be utilized to provide charge supply pressure, also known as pilot supply pressure.

The free wheeling valve 70 is disposed in the body 71 and is fluidly connected to the supply port 200 by the supply channel 210. The free wheeling valve 70 is provided to permit or block fluid flow to the first and second wheel motors 66, 68, thereby controlling whether the machine operates in rear wheel drive or all-wheel drive. In one embodiment, as best shown in FIG. 3, the free wheeling valve 70 may be generally configured as a spool valve having first and second free wheeling valve inlets 74, 76 fluidly communicating with the primary pump 62 and first and second free wheeling valve outlets 78, 80 fluidly communicating with the first and second wheel motors 66, 68. The free wheeling valve 70 may have at least the positions or modes which are schematically illustrated in FIG. 3. In a first or free wheeling mode 82, the free wheeling valve 70 is at its right-most position as shown in FIG. 3. In this position, fluid flow from the primary pump 62 is prevented from flowing out of the first and second free wheeling valve outlets 78, 80. This blocks fluid flow between the supply port 200 and the bypass valve 128 and thereby blocks flow out of the first and second exit ports 204, 206 to the first and second wheel motors 66, 68. In a second or drive assist mode 84, the free wheeling valve 70 is shifted to its left-most position to permit hydraulic fluid to flow to the first and second free wheeling valve outlets 78, 80 and then to the bypass valve 128. In one embodiment, as shown, a third or transition mode 86 may also be provided between the free wheeling and drive assist modes 82, 84 to smooth the transition between drive assist mode 84 and free wheeling mode 82.

The free wheeling pilot valve 73 may be provided to control position of the free wheeling valve 70. The free wheeling pilot valve 73 is disposed in the body 71 and is fluidly connected to the free wheeling valve 70 by the free wheeling pilot channel 224. The free wheeling pilot channel 224 may include a first branch 226 and a second branch 228. Each of the first and second branches 226, 228 may fluidly connect free wheeling pilot valve 73 to the free wheeling valve 70. The second branch 228 may be separate from the first branch 226. In one embodiment, the free wheeling pilot valve 73 may be an electrohydraulic spool valve. As schematically shown in FIG. 3, the free wheeling pilot valve 73 fluidly communicates with pilot pressure ports 92, 94 provided on opposite ends of the free wheeling valve 70. The free wheeling pilot valve 73 may have an energized state or a de-energized state. Depending on the state, the free wheeling pilot valve 73 may shifted to control hydraulic fluid pressures communicated to the pilot pressure ports 92, 94, and thus shift the free wheeling valve 70 to the desired mode.

The main valve 69 may further include the flow divider valve 72 disposed in the body 71. The flow divider valve 72 may be used to execute traction control, thereby to reduce wheel slip. Accordingly, the flow divider valve 72 may include a flow divider inlet 110 fluidly communicating with first and second flow divider outlets 112, 114. The flow divider inlet 110 may be fluidly connected to the third bypass outlet 136 by the flow divider channel 214. The first flow divider outlet 112 is fluidly connected to the first exit port 204 by the first exit channel 216. The second flow divider outlet 114 is fluidly connected to the second exit port 206 by the second exit channel 218. The first flow divider outlet 112 fluidly communicates with the first wheel motor 66 while the second flow divider outlet 114 fluidly communicates with the second wheel motor 68. A flow divider valve member 116 is disposed between the flow divider inlet 110 and the first and second flow divider outlets 112, 114 and may have three positions or modes. In a first or equal flow mode 118, a substantially equal flow of hydraulic fluid is provided to the first and second wheel motors 66, 68, as shown in FIG. 3. The flow divider valve member 116 may be shifted to the right to a first flow mode 120, in which a greater flow of fluid is provided to the first wheel motor 66. Additionally, the flow divider valve member 116 may be shifted to the left to a second flow mode 122, in which a greater flow of fluid is provided to the second wheel motor 68. Operation of the flow divider valve member 116 may be controlled to equalize hydraulic fluid pressure provided to the first and second flow divider outlets 112, 114, thereby to provide traction control.

The main valve 69 may further include a bypass valve 128 for selectively bypassing the flow divider valve member 116 via the first and second bypass channels 124, 126 and deactivating traction control. The first and second bypass channels 124, 126 fluidly communicate around the flow divider valve member 116 to the first and second wheel motors 66, 68, respectively. The bypass valve 128 is disposed in the body 71 and includes a bypass inlet 130 fluidly communicating with the first free wheeling valve outlet 78 via the intermediate channel 212, a first bypass outlet 132 fluidly communicating with the first exit channel 216 via the first bypass channel 124, a second bypass outlet 134 fluidly communicating with the second exit channel 218 via the second bypass channel 126 and a third bypass outlet 136 fluidly communicating with the flow divider inlet 110 via the flow divider channel 214.

A bypass valve member 140 is disposed between the bypass inlet 130 and the bypass outlets 132, 134, 136, and is movable between a bypass mode 142 and a flow dividing mode 144. In the bypass mode 142 shown in FIG. 3, the bypass inlet 130 fluidly communicates with the first and second bypass outlets 132, 134 to route hydraulic fluid from the free wheeling valve 70 around the flow divider valve member 116 and disable traction control. In the illustrated embodiment, the bypass inlet 130 also fluidly communicates with the third bypass outlet 136, however only a limited amount of hydraulic fluid may flow through the flow divider valve member 116. In the flow dividing mode 144, the bypass inlet 130 fluidly communicates only with the third bypass outlet 136, so that substantially all of the hydraulic fluid received from the free wheeling valve 70 is routed through the flow divider valve member 116 to provide traction control. In other words, when the bypass valve 128 is in the flow dividing mode 144, the bypass valve 128 substantially blocks fluid communication between the bypass valve 128 and the first and second bypass channels 124, 126.

The flow divider bypass pilot control valve 75 is disposed in the body 71 and is fluidly connected to the bypass valve 128 by the bypass pilot channel 230. The flow divider bypass pilot control valve 75 is provided to actuate the bypass valve 128 between the bypass and flow dividing modes 142, 144. As schematically shown in FIG. 3, the flow divider bypass pilot control valve 75 fluidly communicates with a pilot pressure port 146 provided on an end of the bypass valve member 140. The flow divider bypass pilot control valve 75 may be shifted to control hydraulic fluid pressure communicated to the pilot pressure port 146, thereby to shift the bypass valve member 140 to the desired mode. In some embodiments, the flow divider bypass pilot control valve 75 may be on/off electrohydraulic valve.

The wheel assist drive system 60 may further include feedback devices to provide information usable in the control of the system. For example, first and second wheel speed sensors 150, 152 may be associated with the first and second wheel motors 66, 68 and or front wheels 18*b* and configured to provide feedback indicative of wheel speed. Other sensors or feedback devices may be provided to provide additional information.

Figure 4:
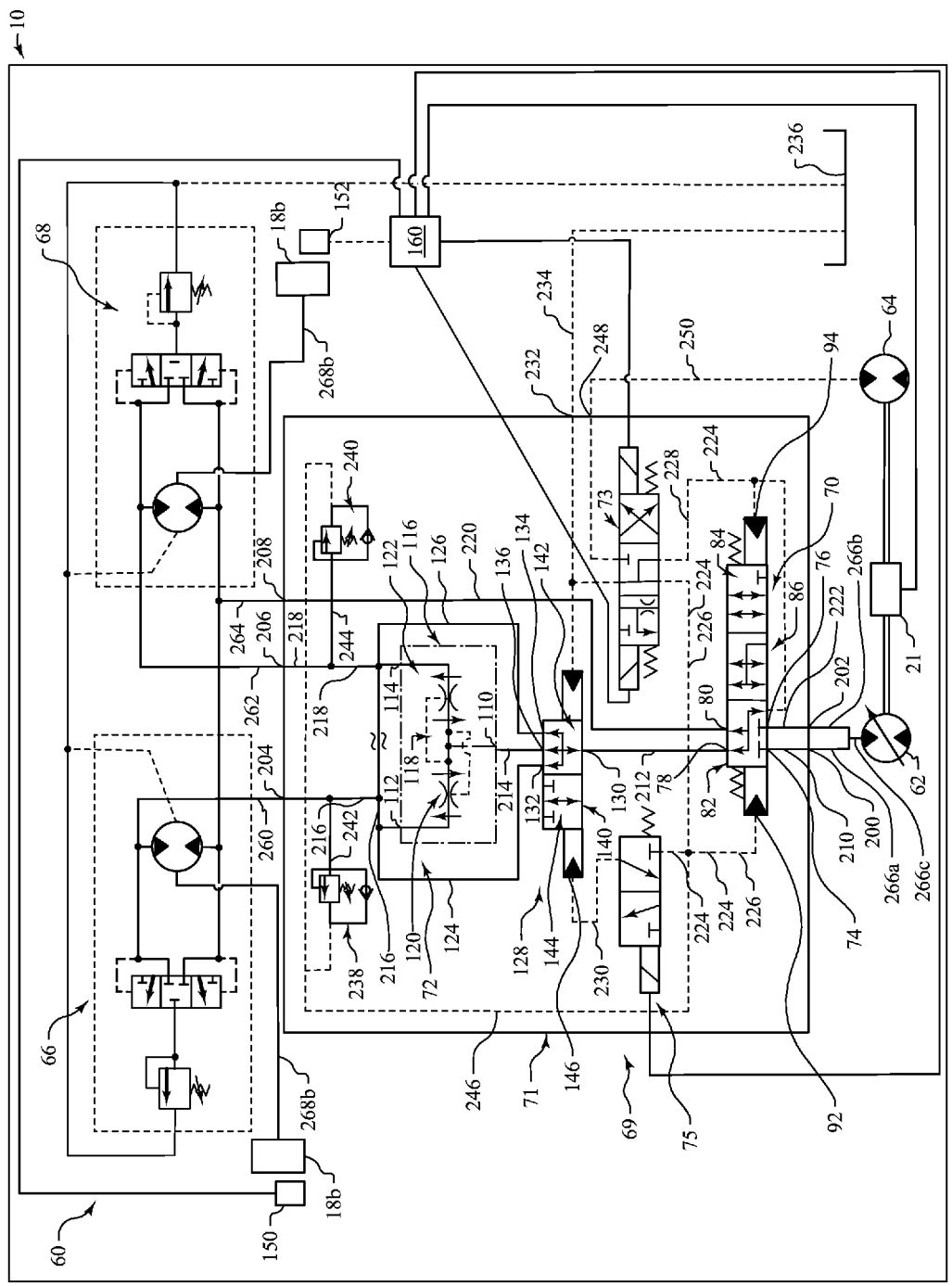
FIG. 4 is a schematic diagram showing an alternative embodiment of a wheel assist drive system of the motor grader constructed in accordance with an aspect of the disclosure.

In some embodiments, the main valve 69 may also comprise one or more anti-cavitation valves 238, 240 (see FIG. 4) disposed in the body 71. For example, in one embodiment, the main valve 69 may comprise a first anti-cavitation valve 238 and a second anti-cavitation valve 240. The embodiment illustrated in FIG. 4 is the same as that illustrated in FIG. 3 with addition of first and second anti-cavitation valves 238, 240. The first anti-cavitation valve 238 is fluidly connected to the first exit channel 216 by a first anti-cavitation channel 242 defined by the body 71 and the second anti-cavitation valve 240 is fluidly connected to the second exit channel 218 by a second anti-cavitation channel 244 defined by the body 71. The body 71 may further include a third anti-cavitation channel 246 defined by the body 71. The third anti-cavitation channel 246 may fluidly connect the first and second anti-cavitation valves 238, 240 to the first branch of the free wheeling pilot channel 224. The anti-cavitation valves 238, 240 provide relief from high system pressures and provide supplemental pressure in low pressure situations. In scenarios where the drive assist is active and the pressure of the hydraulic fluid for one wheel motor drops below the pilot pressure, an anti-cavitation valve 238, 240 will supplement by providing pilot pressure to the motor experiencing the lower hydraulic fluid pressure. For example, if drive assist is active the pressure of the hydraulic fluid in the first exit channel 216 or the second exit channel 218 drops below pilot pressure, then the respective anti-cavitation valve 238, 240 will supplement by providing hydraulic fluid from the pilot pressure source.

A controller 160 may be provided to control operation of the wheel assist drive system 60. For example, the controller 160 may be operably coupled to the free wheeling pilot valve 73 and the flow divider bypass pilot control valve 75 to selectively control the modes of operation of the free wheeling valve 70 and bypass valve member 140. For example, in one embodiment, when the free wheeling pilot valve 73 and the flow divider bypass pilot control valve 75 are both in the de-energized state, the controller 160 may be configured to operate the free wheeling valve 70 in the free wheeling mode 82. In the embodiment, when the free wheeling pilot valve 73 is energized while the flow divider bypass pilot control valve 75 is still de-energized, the controller 160 may be configured to operate the free wheeling valve 70 in the drive assist mode 84. Further, when the free wheeling pilot valve 73 is energized and the flow divider bypass pilot control valve 75 is energized and a traction control signal indicating that fraction control is active is received by the controller 160, the controller 160 may be configured to operate the bypass valve 128 in the flow dividing mode 144 and the flow divider valve 72 in either the equal flow mode 118, or one of the first or second flow modes 120, 122 in order to equalize the hydraulic fluid pressure provided to the first and second flow divider outlets 112, 114. The traction control signal may be the result of signal generated from input to a user interface, or the result of control logic (residing in the controller 160 or elsewhere) or feedback indicative of the level of traction between the front wheels 18b and the surface 11, as is known in the art.

Additionally, the controller 160 may be operably coupled to the first and second wheel speed sensors 150, 152 and the primary power source 21 to receive feedback signals indicative of machine operating parameters or to send control signals to operate one or more machine components. The controller 160 may be configured to determine an activation status of the free wheeling valve 70, to operate the bypass valve member 140 in the bypass mode 142 when the free wheeling valve 70 is in the free wheeling mode 82, and to operate the bypass valve member 140 in either of the bypass mode 142 or the flow dividing mode 144 when the free wheeling valve 70 is in the drive assist mode 84. The controller 160 may include drive-assist-logic circuitry, comprising one or more central processing units and one or more memory devices, the one or more memory devices storing instructions that, when executed by the one or more central processing units, cause the drive-assist-logic circuitry to execute the functions described herein.

Also disclosed is a method of assembling a wheel assist drive system 60 on a motor grader 10 or other machine having first and second wheel motors 66, 68 and a primary pump 62 for circulating a hydraulic fluid. The method may comprise providing a main valve 69 and fluidly connecting the main valve 69 to the first and second wheel motors 66, 68 and the primary pump 62. As illustrated in FIGS. 3-4, in one embodiment, the main valve 69 may be fluidly connected to the first and second wheel motors 66, 68 by the first and second fluid lines 260, 262 and return line 264, and the main valve 69 may be fluidly connected to the primary pump 62 by pump lines 266a, 266b, and 266c. The first and second fluid lines 260, 262, the return line 264, and the pump lines 266a, 266b, and 266c may be hoses or the like. The first and second wheel motors 66, 68 may be connected to the front wheels 18b by mechanical linkage 268a, 268b or the like.

The main valve 69 may include a body 71, a free wheeling valve 70 disposed in the body 71, a bypass valve 128, a flow divider valve 72, a free wheeling pilot valve 73, and a flow divider bypass pilot control valve 75. The body 71 may define a supply port 200, a return port 202, a first exit port 204, a second exit port 206, a return inlet port 208, a supply channel 210, an intermediate channel 212, a flow divider channel 214, a first exit channel 216, a second exit channel 218, a first bypass channel 124, a second bypass channel 126, a return channel 220, a return outlet channel 222, a free wheeling pilot channel 224, and a bypass pilot channel 230. In some embodiments, the main valve 69 may also include first and second anti-cavitation valves 238, 240 and the body 71 may define the first, second and third anti-cavitation channels 242, 244, 246. The body 71 may also define the other ports and channels discussed herein.

The valve body 71 may be an assembly of forged or machined cast parts that when the main valve 69 is assembled create a plurality of channels and cavities. In some embodiments, the one or more of such forged or machined parts may include one or more recesses that when assembled with a mating part creates one or more cavities of the main valve 69. In some embodiments, the forged or machined cast parts may include forged or cast channels, ports, and/or recesses. During assembly, each valve to be disposed within the main valve 69 may be positioned/mounted in an appropriate recess on a forged or machined cast part (such recess forming a cavity in the assembled main valve 69). The forged or machined cast parts and the valves may then be assembled to form the main valve 69.

The free wheeling valve 70 may be disposed in the main valve 69 and may be fluidly connected to the supply port 200 by the supply channel 210. The free wheeling valve 70 may be operable between a free wheeling mode 82 that blocks fluid flow out of the first and second exit ports 204, 206 by blocking fluid flow between the supply port 200 and a bypass valve 128, and a drive assist mode 84 that permits fluid flow out of the first and second exit ports 204, 206 by permitting fluid from the supply port 200 to flow to the bypass valve 128.

The bypass valve 128 may be disposed in the body 71 and fluidly connected to the free wheeling valve 70 by the intermediate channel 212. The bypass valve 128 may be fluidly connected to the first exit channel 216 by the first bypass channel 124. The bypass valve 128 may be fluidly connected to the second exit channel 218 by the second bypass channel 126. The bypass valve 128 may be fluidly connected to a flow divider valve 72. The bypass valve 128 may have a flow dividing mode 144 that permits fluid communication between the free wheeling valve 70 and the flow divider valve 72, and a bypass mode 142 that permits fluid communication between the free wheeling valve 70 and the first and second bypass channels 124, 126.

The flow divider valve 72 may be disposed in the body 71 and include a flow divider inlet 110 fluidly connected to the third bypass outlet 136 by a flow divider channel 214, a first flow divider outlet 112 fluidly connected to the first exit port 204 by the first exit channel 216, a second flow divider outlet 114 fluidly connected to the second exit port 206 by the second exit channel 218, the flow divider inlet 110 in fluid communication with the first and second flow divider outlets 112, 114.

The free wheeling pilot valve 73 may be disposed in the body 71 and may be fluidly connected to the free wheeling valve 70 by the free wheeling pilot channel 224.

The flow divider bypass pilot control valve 75 may be disposed in the body 71 and may be fluidly connected to the bypass valve 128 by the bypass pilot channel 230.

INDUSTRIAL APPLICABILITY

The present disclosure is applicable to machines having wheel drive assist systems 60. Such systems may include a main valve 69 to selectively provide all-wheel drive and to permit traction control. According to the present disclosure, the main valve 69 comprise a body 71 that includes the bypass valve 128 disposed between the free wheeling valve 70 and the flow divider valve 72 to selectively rout hydraulic fluid flow either through or around the flow divider valve 72. The main valve 69 also includes the free wheeling pilot valve 73 and the flow divider bypass pilot control valve 75. All channels between the valves may be defined by the body 71 of the main valve 69. This provides for a novel valve that is durable and less likely to experience wear and deterioration with age and use and potential misalignment during assembly assemblies utilizing hoses and other types of connections between individual valves.

Figure 5:
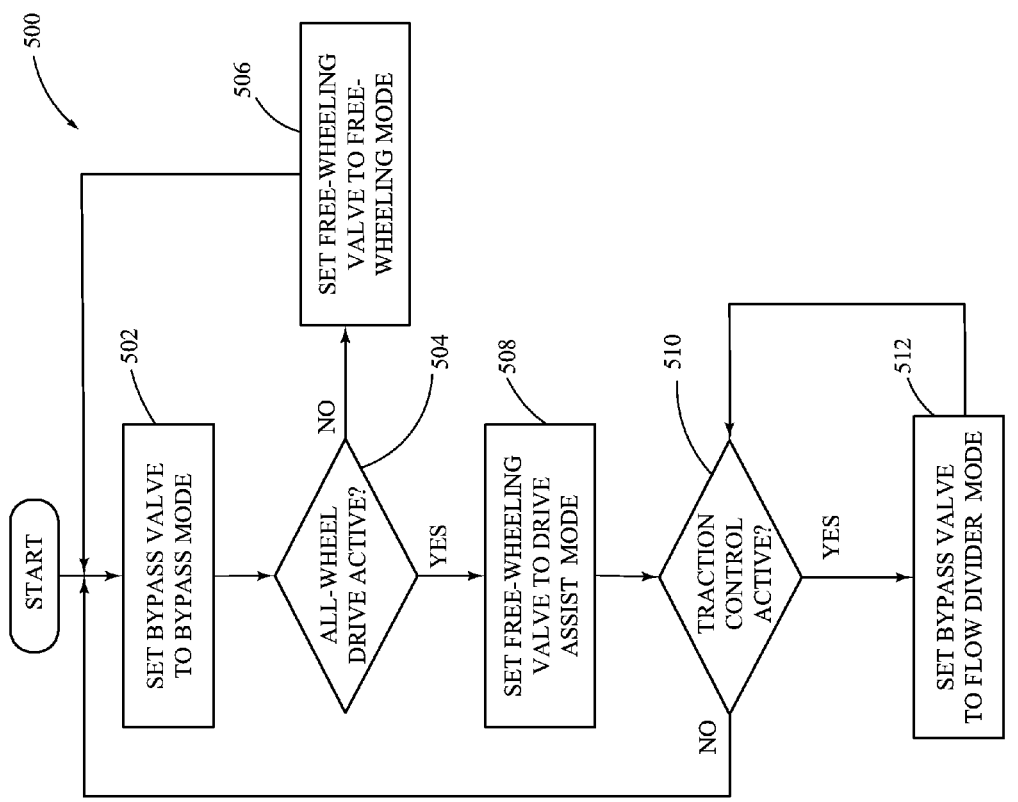
FIG. 5 is a flow chart showing a process of drive assist and traction control in a wheel assist drive system in accordance with an aspect of the disclosure.

FIG. 5 illustrates by way of flowchart an exemplary process 500 for controlling operation of the wheel assist drive system 60. At stage 502 of the process 500, the bypass valve member 140 of the main valve 69 is set to the bypass mode 142. In one embodiment, this may be accomplished by the controller 160 de-energizing the free wheeling pilot valve 73 and de-energizing the flow divider bypass pilot control valve 75 (if it is not already in that state). The process 500 then may continue forward to stage 504.

At stage 504, it is determined whether all-wheel drive is active. All-wheel drive may be activated by user input or control logic residing in the controller 160 or elsewhere. If all-wheel drive is not active, the process continues to stage 506 where, in one embodiment, both the free wheeling pilot valve 73 and the flow divider bypass pilot control valve 75 may be de-energized by the controller 160 to set the free wheeling valve 70 to the free wheeling mode 82. The process 500 then returns to stage 502.

If, however, it is determined at stage 504 that all-wheel drive is active, the process 500 continues forward to stage 508, where the flow divider bypass pilot control valve 75 may be energized by the controller 160 while the free wheeling pilot valve 73 remains de-energized in order to provide pilot pressures that shift the free wheeling valve 70 to the drive assist mode 84 at stage 508.

The process 500 then continues to stage 510, where it is determined whether traction control is active. As with all-wheel drive, traction control may be activated by user input or control logic residing in the controller 160 or elsewhere. If traction control is not active, the process 500 returns to stage 502 and the bypass valve member 140 remains in bypass mode 142.

Otherwise, if it is determined that traction control is active, the process 500 continues forward to stage 512 at which the bypass valve member 140 is set to the flow dividing mode 144. Setting the bypass valve member 140 to the flow dividing mode 144 may be accomplished, for example, by energizing the free wheeling pilot valve 73 and energizing the flow divider bypass pilot control valve 75 to provide a pilot pressure sufficient to shift the bypass valve member 140 to the flow dividing mode 144. The process 500 then returns back to stage 510 to again determine if traction control remains active. When traction control is no longer active, then the process will return to stage 502 at which point the bypass valve member 140 will be returned to the bypass mode 142.

According to the process 500, operation of the bypass valve member 140 is predicated on the status of the free wheeling valve 70. More specifically, if the free wheeling valve 70 is in the free wheeling mode 82, the bypass valve member 140 may be operated only in the bypass mode 142. Thus, the bypass valve member 140 may be operated in the flow dividing mode 144 only when the free wheeling valve 70 is in the drive assist mode 84.

Control of the wheel assist drive system 60 may be executed via the computerized execution of instructions stored on a nontransitory computer-readable medium or memory, e.g., a disc drive, flash drive, optical memory, ROM, etc. The executing entity may be one or more controllers and may be separate from or part of one or more existing controllers such as one or more engine controllers and/or transmission controllers.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:
1. A main valve comprising:
a body defining a supply port, a first exit port, a second exit port, an intermediate channel, a flow divider channel, a first bypass channel, a second bypass channel, a free wheeling pilot channel, and a bypass pilot channel;
a free wheeling valve disposed in the body and fluidly connected to the supply port, the free wheeling valve operable between a free wheeling mode that blocks fluid flow out of the first and second exit ports by blocking fluid flow between the supply port and a bypass valve, and a drive assist mode that permits fluid flow out of the first and second exit ports by permitting fluid from the supply port to flow to the bypass valve;
the bypass valve disposed in the body and fluidly connected to the free wheeling valve by the intermediate channel, the bypass valve fluidly connected to the first and second bypass channels and a flow divider valve, the bypass valve having a flow dividing mode that permits fluid communication between the free wheeling valve and the flow divider valve, and a bypass mode that permits fluid communication between the free wheeling valve and the first and second bypass channels;
a flow divider valve disposed in the body and including a flow divider inlet fluidly connected to the bypass valve by the flow divider channel, a first flow divider outlet fluidly connected to the first exit port, and a second flow divider outlet fluidly connected to the second exit port, the flow divider inlet in fluid communication with the first and second flow divider outlets;

a free wheeling pilot valve disposed in the body and fluidly connected to the free wheeling valve by the free wheeling pilot channel; and a flow divider bypass pilot control valve disposed in the body and fluidly connected to the bypass valve by the bypass pilot channel.

2. The main valve of claim 1, wherein when the bypass valve is in the flow dividing mode, the bypass valve substantially blocks fluid communication between the bypass valve and the first and second bypass channels.

3. The main valve of claim 1, in which the free wheeling pilot channel includes a first branch and a second branch, wherein the free wheeling valve is fluidly connected to the free wheeling pilot valve by both the first and second branches.

4. The main valve of claim 3, wherein the flow divider bypass pilot control valve is fluidly connected to the free wheeling valve by the first branch of the free wheeling pilot channel.

5. The main valve of claim 1, wherein the flow divider bypass pilot control valve is fluidly connected to the free wheeling valve by the free wheeling pilot channel.

6. The main valve of claim 1, in which the body includes a tank port and a tank channel extending between the bypass valve and the tank port.

7. The main valve of claim 6, wherein the tank channel is disposed in the body to extend between the free wheeling pilot valve and the tank port.

8. The main valve of claim 1, further including a first anti-cavitation valve disposed in the body.

9. A method of assembling a wheel assist drive system on a machine having first and second wheel motors and a primary pump for circulating a hydraulic fluid, the method comprising:

providing a main valve that includes:
  a body defining a supply port, a return port, a first exit port, a second exit port, a return inlet port, a supply channel, an intermediate channel, a flow divider channel, a first exit channel, a second exit channel, a first bypass channel, a second bypass channel, a return channel, a return outlet channel, a free wheeling pilot channel, and a bypass pilot channel;
  a free wheeling valve disposed in the body, the free wheeling valve fluidly connected to the supply port by the supply channel, the free wheeling valve operable between a free wheeling mode that blocks fluid flow out of the first and second exit ports by blocking fluid flow between the supply port and a bypass valve, and a drive assist mode that permits fluid flow out of the first and second exit ports by permitting fluid from the supply port to flow to the bypass valve;
  the bypass valve disposed in the body and fluidly connected to the free wheeling valve by the intermediate channel, the bypass valve fluidly connected to the first exit channel by the first bypass channel, the bypass valve fluidly connected to the second exit channel by the second bypass channel, the bypass valve fluidly connected to a flow divider valve, the bypass valve having a flow dividing mode that permits fluid communication between the free wheeling valve and the flow divider valve, and a bypass mode that permits fluid communication between the free wheeling valve and the first and second bypass channels;
  a flow divider valve disposed in the body and including a flow divider inlet fluidly connected to the bypass valve by a flow divider channel, a first flow divider outlet fluidly connected to the first exit port by the first exit channel, and a second flow divider outlet fluidly connected to the second exit port by the second exit channel, the flow divider inlet in fluid communication with the first and second flow divider outlets;
  a free wheeling pilot valve disposed in the body and fluidly connected to the free wheeling valve by the free wheeling pilot channel; and
  a flow divider bypass pilot control valve disposed in the body and fluidly connected to the bypass valve by the bypass pilot channel; and fluidly connecting the main valve to the first and second wheel motors and primary pump.

10. The method of claim 9, in which the machine comprises a motor grader.

11. The method of claim 10, in which the motor grader comprises a pair of rear wheels and a pair of front wheels, and in which the first and second wheel motors are coupled to the pair of front wheels.

12. The method of claim 9, wherein the main valve further includes including a first anti-cavitation valve disposed in the body and in fluid communication with the first exit channel and a second anti-cavitation valve disposed in the body and in fluid communication with the second exit channel.

13. A wheel assist drive system for use on a machine having a primary pump and first and second ground-engaging members, the wheel assist drive system comprising:

a hydraulic first wheel motor operably coupled to the first ground-engaging member;

a hydraulic second wheel motor operably coupled to the second ground-engaging member;

a main valve including:
  a body defining a supply port, a return port, a first exit port, a second exit port, a return inlet port, a supply channel, an intermediate channel, a flow divider channel, a first exit channel, a second exit channel, a first bypass channel, a second bypass channel, a return channel, a return outlet channel, a free wheeling pilot channel, and a bypass pilot channel;
  a free wheeling valve disposed in the body, the free wheeling valve including a first free wheeling valve inlet fluidly connected to the supply port by the supply channel, a second free wheeling valve inlet fluidly connected to the return port by the return outlet channel, a first free wheeling valve outlet fluidly connected to the first free wheeling valve inlet, a second free wheeling valve outlet fluidly connected to the second free wheeling valve inlet, the free wheeling valve operable between a free wheeling mode that blocks fluid flow out of the first and second exit ports by blocking fluid between the supply port and the first free wheeling valve outlet, and a drive assist mode that permits fluid flow out of the first and second exit ports by permitting fluid from supply port to flow out of the first free wheeling valve outlet;
  a bypass valve disposed in the body, the bypass valve including a bypass inlet fluidly connected to the first free wheeling valve outlet by the intermediate channel, a first bypass outlet fluidly connected to the first exit channel by the first bypass channel, a second bypass outlet fluidly connected to the second exit channel by the second bypass channel, and a third bypass outlet, the bypass valve having a flow dividing mode that permits fluid communication between the free wheeling valve and the flow divider valve, and a bypass mode that permits fluid communication between the free wheeling valve and the first and second bypass channels;

a flow divider valve disposed in the body and including a flow divider inlet fluidly connected to the third bypass outlet by a flow divider channel, a first flow divider outlet fluidly connected to the first exit port by the first exit channel, and a second flow divider outlet fluidly connected to the second exit port by the second exit channel, the flow divider inlet in fluid communication with the first and second flow divider outlets;

a free wheeling pilot valve disposed in the body and fluidly connected to the free wheeling valve by the free wheeling pilot channel; and a flow divider bypass pilot control valve disposed in the body and fluidly connected to the bypass valve by the bypass pilot channel; and a controller operably coupled to the free wheeling valve and the bypass valve, the controller being configured to:

determine an activation status of the free wheeling valve;

operate the bypass valve in the bypass mode when the free wheeling valve is in the free wheeling mode; and operate the bypass valve in either of the bypass mode and the flow dividing mode when the free wheeling valve is in the drive assist mode.

14. The wheel assist drive system of claim 13, in which the main valve further includes a first anti-cavitation valve disposed in the body and in fluid communication with a first exit channel.

15. The wheel assist drive system of claim 14, in which the main valve further includes a second anti-cavitation valve disposed in the body and in fluid communication with a second exit channel.

16. The wheel assist drive system of claim 14, in which the body further includes an anti-cavitation channel extending from the first anti-cavitation valve to the free wheeling pilot channel.

17. The wheel assist drive system of claim 13, in which the free wheeling pilot channel includes a first branch and a second branch, wherein the free wheeling valve is fluidly connected to the free wheeling pilot valve by the first branch, and is fluidly connected to the free wheeling pilot valve by the second branch, the first branch separate from the second branch.

18. The wheel assist drive system of claim 13, in which the controller is further configured to operate the free wheeling valve in free wheeling mode when the free wheeling pilot valve and the flow divider bypass pilot control valve are de-energized.

19. The wheel assist drive system of claim 13, in which the controller is further configured to operate the free wheeling valve in a drive assist mode when the free wheeling pilot valve is energized and the flow divider bypass pilot control valve is de-energized.

20. The wheel assist drive system of claim 13, in which the flow divider valve has a first flow mode in which a greater flow of fluid is provided to the first wheel motor, and a second flow mode in which a greater flow of fluid is provided to the second wheel motor, and controller is further configured to operate the bypass valve in flow dividing mode and the flow divider valve in either a first or a second flow mode when both the free wheeling pilot valve and the flow divider bypass control valve are energized and traction control is active.

* * * * *